United States Patent [19]
Kritz et al.

[11] 3,795,893
[45] Mar. 5, 1974

[54] DOPPLER SPEED LOG

[75] Inventors: Jacob A. Kritz, Westbury; Seymour D. Lerner, Plainview, both of N.Y.

[73] Assignee: Sperry Rand Corporation, New York, N.Y.

[22] Filed: July 6, 1971

[21] Appl. No.: 159,853

[52] U.S. Cl.......................... 340/3 D, 343/8, 343/9
[51] Int. Cl............................................... G01s 9/66
[58] Field of Search............ 340/3 D, 3 R; 343/8, 9

[56] References Cited
UNITED STATES PATENTS

| | | | |
|---|---|---|---|
| 2,422,064 | 6/1947 | Anderson et al. | 340/3 D |
| 3,257,638 | 6/1966 | Kritz et al. | 340/3 D |
| 3,337,840 | 8/1967 | Turner | 340/3 D |
| 3,541,499 | 11/1970 | Lange | 340/3 D |
| 3,648,225 | 3/1972 | Kritz et al. | 340/3 D |

Primary Examiner—Samuel Feinberg
Assistant Examiner—R. Kinberg
Attorney, Agent, or Firm—S. C. Yeaton; Howard P. Terry; Joseph M. Roehl

[57] ABSTRACT

A doppler speed log for marine vessels transmits fore and aft pulses of high frequency sonic energy. The log normally operates in a mode such that a gating pulse permits signal processing circuits to respond only to signals derived from reflections from minute scatterers in the water occurring at a specified distance from the hull of the vessel. If the vessel is in shallow water, a variable threshold comparator permits the signal processing circuits to respond to reflections from the sea bottom when the magnitude of these reflected signals exceeds the threshold level. The processing circuit forms fore and aft enabling pulses each having a duration equal to the time required for the reception of a specified number of cycles of sonic energy reflected from the fore and aft directions, respectively. Pulses from a calibrated clock source are applied to an up-down counter during the time that only one of the enabling pulses exists. The readings corresponding to a specified number of transmitted pulses are accumulated and displayed on a suitable readout means.

16 Claims, 5 Drawing Figures

DOPPLER SPEED LOG

BACKGROUND OF THE INVENTION

1. Field of the Invention

This invention relates to marine navigation systems and more specifically to pulsed sonar doppler navigation systems.

2. Description of the Prior Art

A variety of sonar doppler navigators is known in the art. One class of these navigators, generically labelled "Janus" type navigators, utilizes a forward-looking and an aft-looking sonic beam. Motion of the vessel causes doppler shifts in the frequency of the sound waves reflected from the ocean bottom. This results in a difference in frequencies of the reflected fore and aft beams and permits a measurement of the motion and speed of the vessel.

Prior art speed logs recognize the fact that in order to obtain accurate measurements, the necessary information must be gathered from areas in the water remote from the hull of the vessel. Such prior art devices use protruding members for supporting transducers. Such protruding members, however, are easily fouled and broken.

Furthermore, prior art pulse doppler speed logs are known in which the received pulses are converted to c.w. signals for subsequent processing. Because of the complex nature of the return signal, however, such devices are somewhat inaccurate. For example, some devices utilize a phase-locked loop which locks onto the received pulses and "remembers" the frequency between pulses so as to construct a c.w. signal which can be readily instrumented. High accuracy requires that the true average frequency be taken over the entire pulse. However, this requirement can only be approached in such prior art circuits because of the large bandwidth occupied by the received doppler spectrum.

SUMMARY OF THE INVENTION

The speed log of the present invention utilizes flush mounted sonic transducers in a Janus system to measure doppler shifted signals reflected from scatterers located remotely from the hull by actuating signal processing circuits only after a predetermined delay so that energy backscattered from water reflectors close to the hull is ignored. The device further includes a time-varying threshold circuit which permits signals reflected from the bottom to actuate the signal processing circuits when the vessel is in shallow water. The processing circuits generate fore and aft enabling pulses having durations equal to a specified number of periods of the respective received signals. The difference in duration of pairs of enabling pulses is used as a measure of the differential doppler shift experienced by corresponding fore and aft sonic pulses.

DESCRIPTION OF THE PREFERRED EMBODIMENT

The doppler speed log of the present invention measures water speed and distance travelled through the water by the vessel in which the log is installed. The device operates by transmitting beams of sonic energy outwardly and downwardly from the vessel and then measuring the doppler-shifted signals reflected from scatterers such as small particles suspended in the water, plankton, air bubbles, sand and the like. Such discontinuities in the water scatter the sonic energy which illuminates them in all directions.

Figure 1:
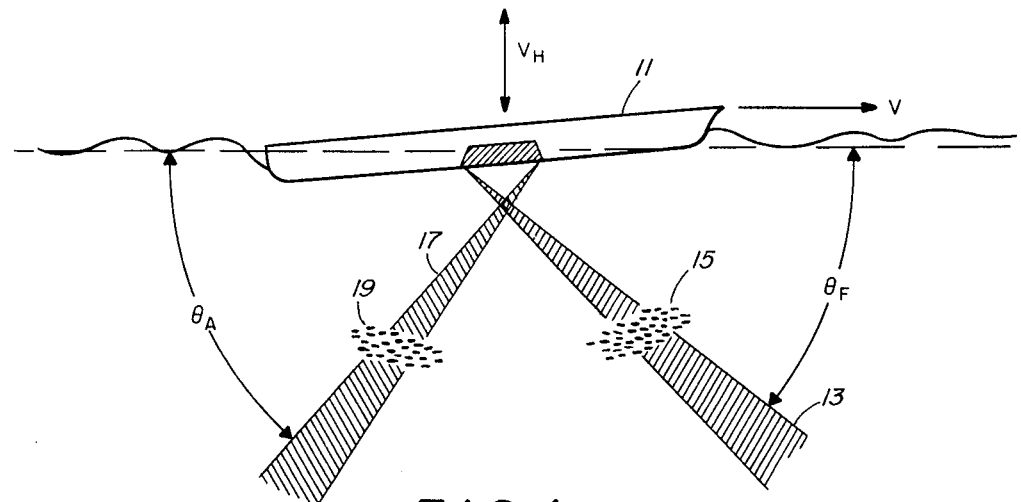
FIG. 1 is a diagram illustrating the sonic transmission scheme used in the present invention.

The invention employs pairs of piezo-electric tranducers to transmit narrow beams of sonic energy at a frequency $f_o$ in the fore and aft directions. Referring more particularly to FIG. 1, a vessel 11 moves in a forward direction at a horizontal velocity V. In addition to the forward motion, the vessel is subjected to a vertical heaving motion $V_H$. A forward-looking beam of sonic energy 13 irradiates scatterers 15 which reflect a portion of this sonic energy back to the forward-looking transducer. At the same time, an aft-looking transducer produces a second beam of sonic energy 17 which illuminates scatterers 19. A portion of the energy illuminating the scatterers 19 is also reflected back to the aft-looking transducer.

The transducers are disposed so that the beams of sonic energy are formed at a particular angle with respect to the hull of the vessel. Typically, the transducers are disposed so that the beams make and angle of 60° with respect to the longitudinal axis of the vessel.

Since the vessel tends to pitch about a transverse axis in response to wave motion, the beams 13 and 17 tend to oscillate with respect to the horizon. In the diagram of FIG. 1, therefore, the angle $\theta_F$ is taken with respect to the horizontal and is momentarily less than the angle that the beam 13 makes with the longitudinal axis of the vessel. Similarly, $\theta_A$ is indicated as being greater than the corresponding aft angle since this angle is also measured with respect to the horizontal.

As the vessel moves through the water, the frequency of one of the return signals is increased whereas the frequency of the opposite return signal is decreased.

Assuming that the vessel pitches throughout an angle $\pm\phi$, the indicated speed is given by the formula:

$$V_i \alpha 2f_o/c[V(1-\phi^2 12) + V_H\phi]$$

The first term of the equation corresponds to the true surface velocity V. The transmitter frequency $f_o$ is maintained constant by use of a crystal controlled oscillator. Changes in the propagation velocity c with water temperature are compensated as will be described. A decrease in the proportionality constant of V is always produced when the vessel pitches through a significant pitch angle $\phi$. The sensitivity to $\phi$ is, however, fairly low. For example, if the pitch is assumed to vary sinusoidally with time with an amplitude of 6°, the average proportionality error is 0.25 percent.

To the extent that a correlation exists between instantaneous values of heave velocity $V_H$ and pitch angle $\phi$, the second term of the equation produces an average offset error. Except in heavy sea states at low speeds, however, this effect is negligible.

As will be described, the signal processing in the speed log utilizes the difference between average periods of fore and aft received signals. From these data it can be shown that, for the usual marine speeds, this difference in average period is equivalent to measuring the difference between the frequencies of the fore and aft return signals.

Since the return signals arise from reflections from diffuse scatterers, the return is actually the summation of the returns from all of the various scatterers illuminated by the incident beam. To the extent that the beam has finite width, the angles $\theta_F$ and $\theta_A$ vary slightly from particle to particle. Furthermore, the individual particles may have slight random motions with respect to one another and with respect to the transducer. This causes slight differences in frequency among the component backscattered returns.

Figure 2:
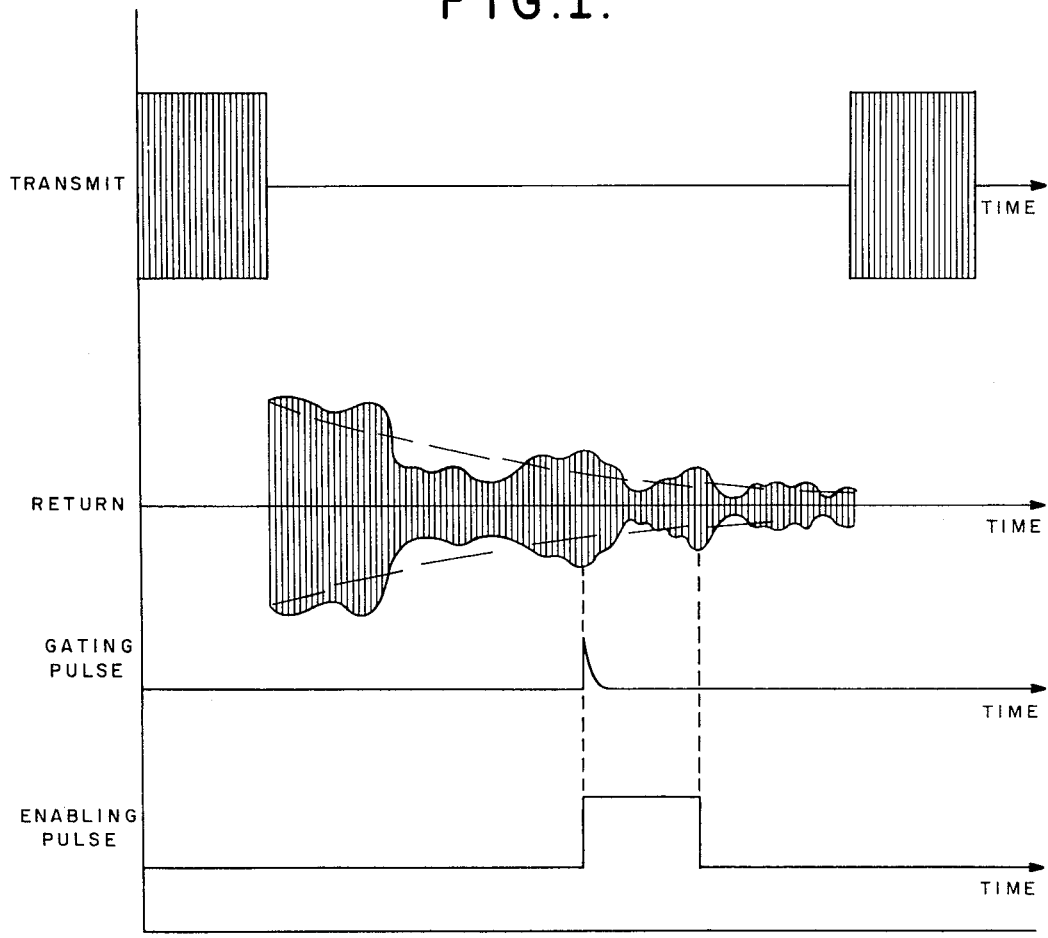
FIG. 2 is a diagram illustrating the timing format used in the present invention.

Summation of the individual returns yields a "signal" with the same characteristic as narrow band noise. In the frequency domain, the return is a narrow "smear" encompassing a band of frequencies rather than the ideal impulse function which would represent a single frequency. The doppler speed log obtains an estimate of the frequency represented by each return which is as accurate and steady as possible. In order to achieve the desired requirement that measurement be made relative to particles remote from the vessel, a pulsed mode of operation is employed. As indicated in FIG. 2, which represents a single measuring epoch in one of the fore and aft channels, the device uses transmit pulses of short duration spaced at relatively long intervals. In a typical device, transmission pulses having a duration of 1.3 milliseconds are generated at 7.31 millisecond intervals.

During the time that the sonic pulse is being transmitted, the circuits of the speed log block off the receivers. The return pulse, as illustrated in FIG. 2, consists of a complex wave shape generally exhibiting an exponential decay.

At a predetermined time in each measuring epoch, a gating pulse is generated which permits the circuits to accept a definite number of cycles of the water return pulse. In a typical speed log, the gating pulse is generated 4 milliseconds after the beginning of the transmit pulse. This accepts energy from a region between 10 feet and 13 feet from the hull of the vessel.

It will be appreciated that each of the fore and aft channels utilize individual sonic waves and enabling pulses of the type illustrated in FIG. 2.

Fore and aft enabling pulses are used in the speed log to permit calibrated clock pulses to pass into an up-down counter so as to produce the actual speed display. The results of a number of epochs of transmit-receive operation are averaged to generate a single speed display. In a typical speed log, 384 epochs are averaged to generate a single display.

Although not restricted to a particular frequency, the speed log operates most efficiently at a relatively high frequency. Both the backscattered signal intensity and attenuation increase with frequency. It has been observed that a sonic carrier frequency in the order of 2 MHz yields maximum return from a water mass at a range of about 10 feet. The use of such a relatively high frequency also reduces the scatter in speed readings since an increased number of periods may be averaged in a practical time period. The use of such a relatively high frequency also permits a significant reduction in the size, weight and cost of a transducer assembly.

Figure 3:
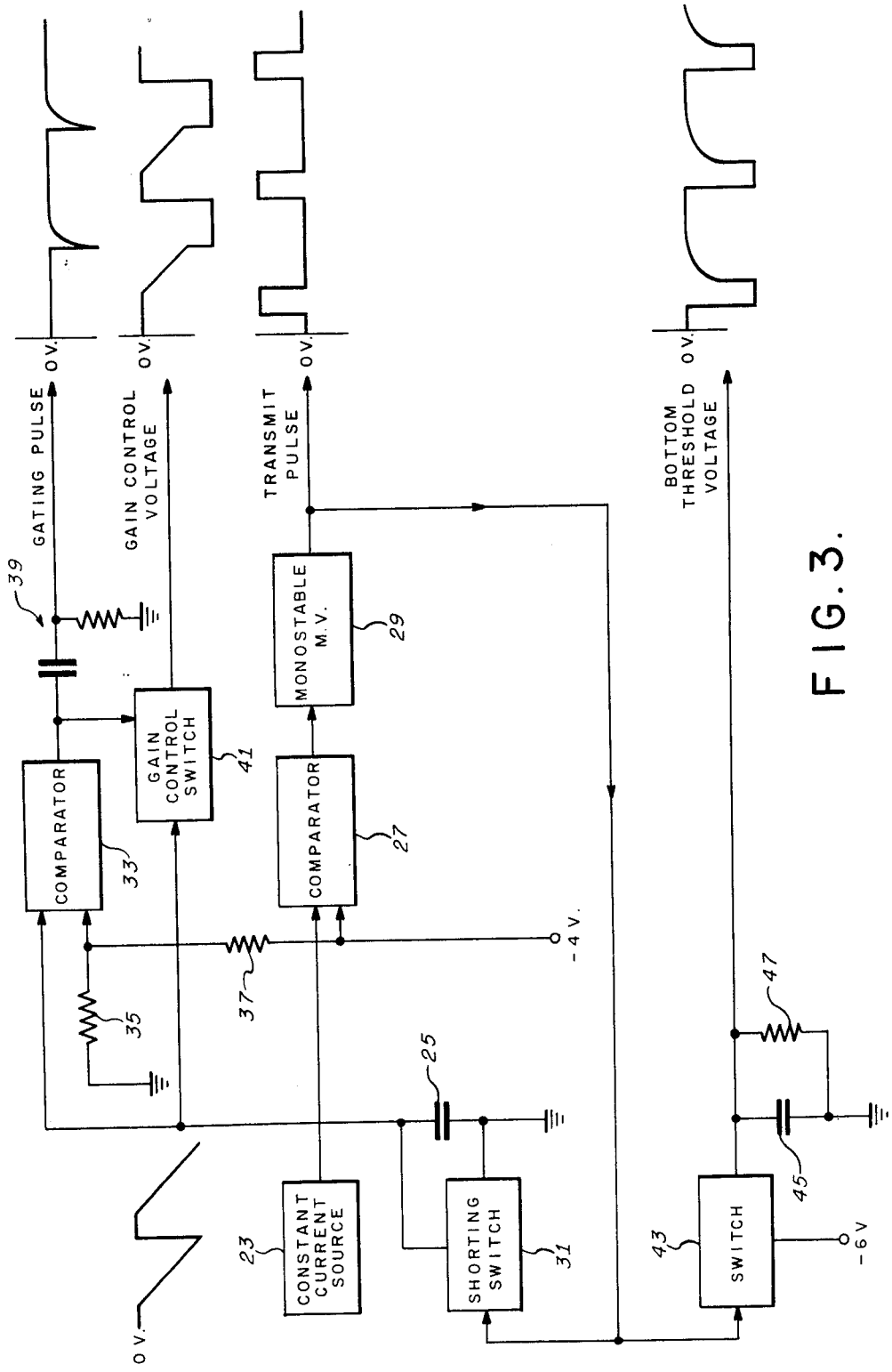
FIGS. 3 to 5 are block diagrams useful in explaining the principles and operation of the present invention.
Figure 4:
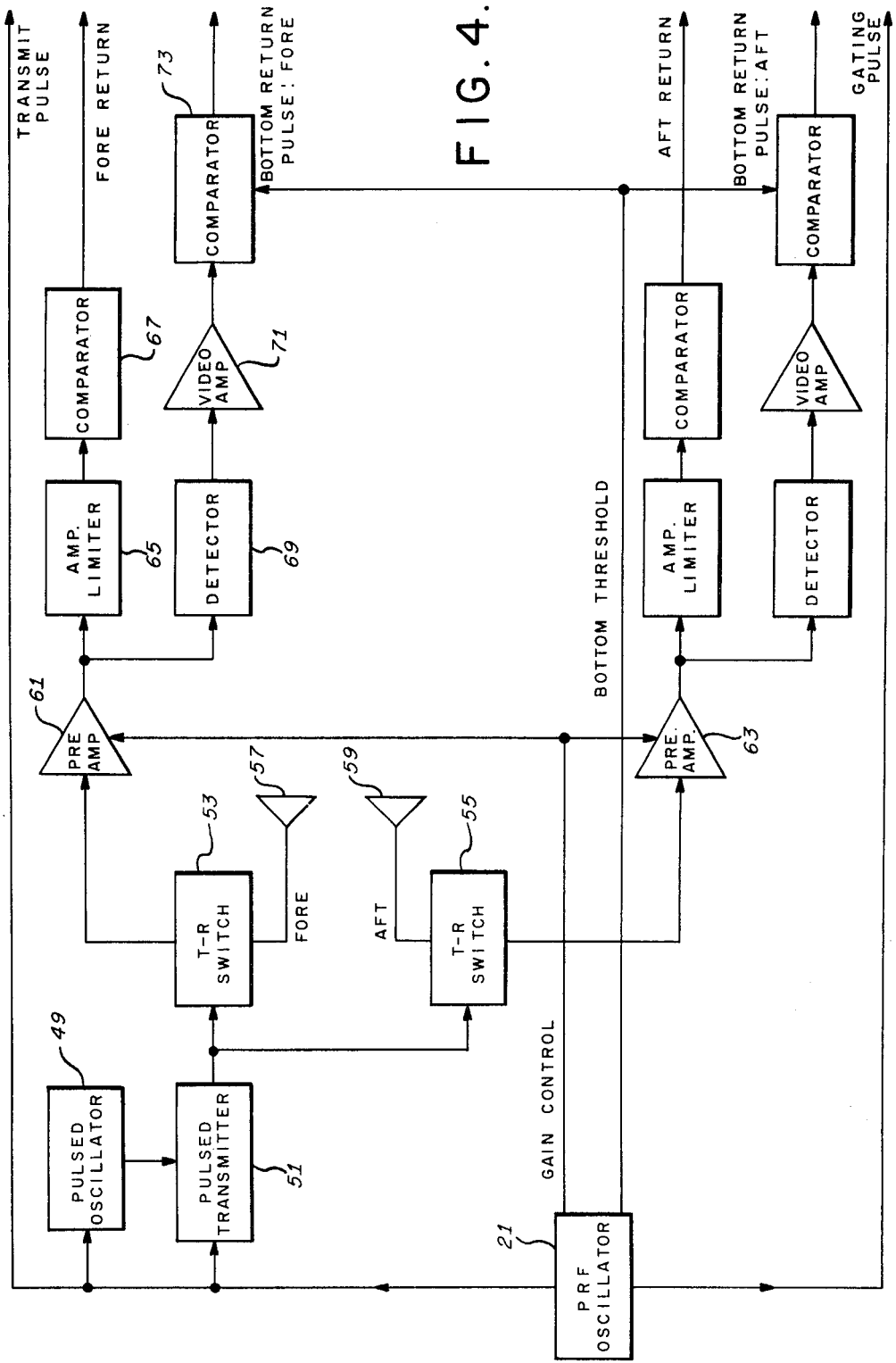
Figure 5:
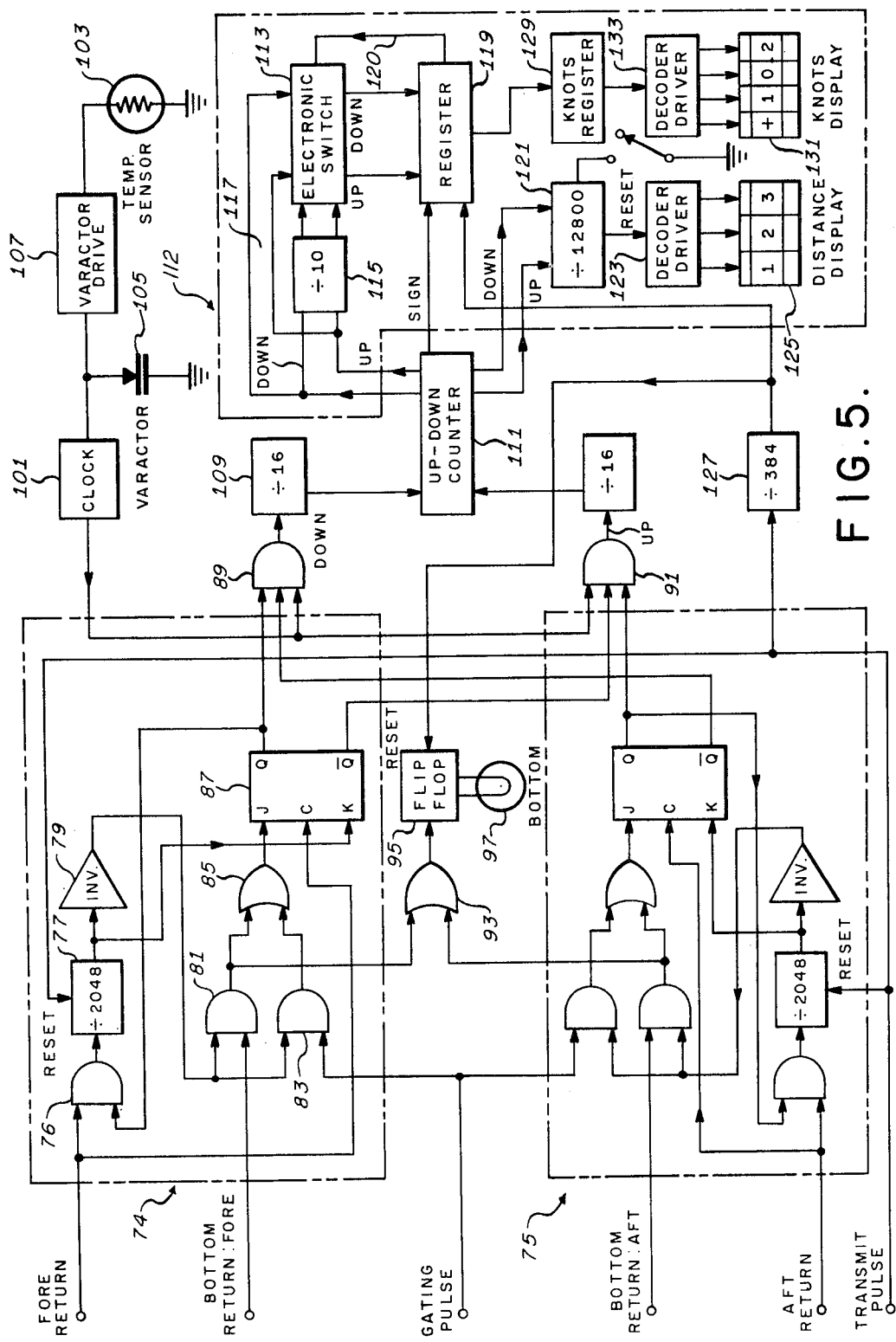

The overall system of the speed log is depicted in accompanying FIGS. 4 and 5. The operation of the speed log is coordinated by a pulse repetition frequency (PRF) oscillator 21 as shown in FIG. 4. The PRF oscillator produces several pulse trains having certain critical relationships as will become apparent as the discussion proceeds. A particular PRF oscillator suitable for use with the speed log is depicted in more detail in FIG. 3 in which a constant current source 23 charges a capacitor 25 linearly in a negative direction. A transmit pulse comparator 27 is referenced to a suitable negative voltage typically in the order of −4 volts. As the negative charge on the capacitor 25 builds up to a value equal to the reference voltage, the comparator 27 triggers a monostable multivibrator 29. The multivibrator 29 has a quasi-stable period equal to the desired pulse duration of the transmit pulse. When the multivibrator 29 is in the quasi-stable state, it provides a switching signal to the shorting switch 31 which rapidly discharges the capacitor 25. Thus the output of the multivibrator constitutes a transmit pulse having desired duration and spacing. The voltage on the capacitor 25 is also applied to a gating pulse comparator 33. The comparator 33 is referenced to an intermediate voltage by means of divider resistors 35 and 37. Typically, the divider resistors are selected to provide a reference voltage for the comparator 33 in the order of −2 volts.

As the voltage on the capacitor 25 approaches the reference voltage of the comparator 33, this comparator produces an output signal which is differentiated in the R-C circuit 39 to provide a sharp gating pulse.

Thus the circuit produces a gating pulse at a predetermined time after the occurrence of each transmit pulse.

A gain control circuit functionally shown as a gain control switch 41 couples the voltage on the capacitor 25 to the receiver circuits when the capacitor voltage is less than the reference voltage on the comparator 33. When the comparator 33 switches so as to produce an output voltage, however, this output voltage is applied through the gain control switch 41 to the receiver circuits. The output voltage from the gain control switch constitutes a gain control voltage. This gain control voltage is used for controlling the gain of preamplifiers as will be described. Briefly, the gain control voltage serves to increase the gain of the preamplifiers as the voltage becomes more negative. Thus, the gain control voltage increases the gain of these preamplifiers linearly from the termination of a transmit pulse until the occurrence of a gating pulse. The gain control voltage then switches the preamplifiers to a maximum gain condition until the beginning of the following transmit pulse.

The PRF oscillator also contains means for producing a bottom threshold voltage. A switch 43 charges a capacitor 45 to a suitable negative voltage such as −6 volts in response to an output voltage from the multivibrator 29. After the termination of the pulse from the multivibrator 29, the switch 43 opens and the capacitor 45 discharges exponentially through a resistor 47. The capacitor 45 and the resistor 47 are selected to provide an exponential decay that matches the increase in attenuation of the sonic return with range.

Referring now to FIG. 4, a transmit pulse from the PRF oscillator 21 triggers a pulsed oscillator 49 and its companion pulsed transmitter 51. The ouput of the pulsed transmitter 51 is applied through first and second transmit-receive switches 53 and 55 to fore an aft transducers 57 and 59 respectively.

The transmit-receive switches are straightforward devices, analogous to transmit-receive switches used in radar circuits.

Energy backscattered from scatterers in the water, or from the ocean bottom if the vessel is in shallow water, is received by the fore and aft transducers acting as hydrophones. After passing through the TR switches, the returns encounter identical fore and aft receivers. The fore and aft receivers include preamplifiers 61 and 63, respectively. The gain of the preamplifiers is governed by the gain control voltage from the PRF oscillator 21. The output signal from the preamplifier 61 is applied to a first sub-channel containing a conventional tuned amplifier-limiter 65 and a zero-crossing-detecting comparator 67. The comparator 67 switches each time the signal from the limiter 65 passes through zero.

The output of the preamplifier 61 is also applied to a second sub-channel including a detector 69, a video amplifier 71 and a comparator 73. The bottom threshold voltage wave from the PRF oscillator 21 is used as a reference voltage for the comparator 73. The output voltage from the comparator 73 constitutes a bottom return pulse for use in the fore-channel of the speed log. If the vessel is travelling in shallow water, the bottom return pulse opens the processing channels to initiate a measuring epoch. If the vessel is travelling in deeper water, a gating pulse is used to initiate a measuring epoch.

When the vessel is travelling in shallow water, sonic returns of relatively strong intensity will be reflected from the ocean bottom. The corresponding received voltage experiences a spreading loss which varies linearly with depth. The circuit of FIG. 4 overcomes the effect of such linear loss by means of a linearly increasing gain produced by the gain control voltage applied to the preamplifier 61.

The return signals from the bottom also experience an attenuation loss that varies exponentially with depth. The circuit of FIG. 4 compensates for this attenuation loss by means of the exponentially decreasing bottom threshold voltage. This voltage decreases the reference voltage applied to the comparator 73.

Since the time required for a return pulse to reach the hydrophones increases with the distance to the ocean bottom, and since the gain control voltage and the bottom threshold voltage are also functions of time, these voltages serve to normalize the bottom detection threshold of the speed log.

Because of the high frequency of the sonic signal preferred for use with the speed log, water depths greater than about 10 feet provide only weak bottom return signals having insufficient amplitude to exceed the bottom threshold reference voltage. The sensitivity of the bottom threshold voltage can be set by adjusting the gain of the video amplifier 71 so that substantially all returns from a shallow sea bottom will produce a bottom trigger.

Under normal conditions, when the vessel is travelling in water having a depth greater than about 10 feet, any bottom return is too small to open the processing channels. The processing channels then remain closed until the occurrence of a gating pulse which permits the returns from scatterers in the sea water to be processed. Since the gating pulse serves to switch the preamplifiers to maximum gain, the returns from the scatterers are adequate to actuate the circuits in the processing channel.

The output of the preamplifier 63 in the second channel of the speed log is applied to first and second sub-channels for producing aft return and aft bottom returns, respectively. The construction of these sub-channels is identical to the construction of the sub-channels supplied from the preamplifier 61 as previously described.

The elements of the speed log pictured in FIG. 5 accept fore and aft signals, bottom return signals, gating pulses, and transmit pulses. This section of the circuit performs counting and gating operations necessary to produce the digital speed and distance displays.

The circuits depicted in FIG. 5 include enabling logic sections 74 and 75 in the fore and aft channels respectively. The fore return is applied to an AND gate 76. The output of the AND gate is applied through an overflow counter 77 which typically counts 2,048 pulses and then overflows to provide a logic ONE signal which is inverted in a conventional inverter 79. The output of the inverter 79 is applied to a pair of AND gates 81 and 83. The output terminals from the gates 81 and 83 are applied to an OR gate 85 and then to the J input terminal of a J-K flip-flop 87. The fore return applied to the gate 76 is also applied to the clock input terminal C of the flip-flop 87.

The voltage at the Q output terminal of the flip-flop 87 constitutes a time gate and provides direct enabling pulses which are applied to a second input terminal on the AND gate 76 and to an AND gate 89. The complementary output terminal $\overline{Q}$ of the flip-flop 87 provides complementary enabling pulses which are applied to an AND gate 91 in the aft channel of the circuit.

The fore bottom return pulses from the receiver are applied to the AND gate 81.

The gating pulses from the PRF oscillator 21 are also applied to the AND gate 83.

The output of the AND gate 81 is also applied through an OR gate 93 to a flip-flop 95. The flip-flop 95 is connected to energize an indicator lamp 97 in response to a pulse from the OR gate 93.

The second enabling logic section 75 responds to return signals from the aft channel of the receiver and is constructed identically with the first enabling logic section in the fore channel.

The operation of the enabling logic sections may be understood by first considering the operation of the enabling section in the fore channel when the vessel is in shallow water. Under these conditions, a bottom return signal will be sufficiently strong to overcome the bottom threshold applied to the comparator 73 of FIG. 4 so as to produce a bottom return pulse.

A transmit pulse from the PRF oscillator 21 resets the counter 77 and the corresponding counter in the aft channel. This produces a low level (binary ZERO) signal at the output of the counter 77 and a corresponding high level signal at the output of the inverter 79 so as to enable the gates 81 and 83. When the assumed bottom return pulse occurs, it is able to pass through the gate 81 and the OR gate 85 to the J input terminal of the flip-flop 87.

It will be appreciated that when the vessel is in shallow water so that a bottom return pulse is produced, an oscillatory water return signal also passes through the first sub-channel.

The first negative-going transition of the fore return applied to the gate 76, after the flip-flop 87 has received a signal at its J input terminal, serves to switch the flip-flop so that a direct enabling pulse is produced at its Q output terminal when the voltage on the terminal goes to logic ONE. This, in turn, permits the fore return signal to pass to the counter 77 through the gate 76. After counting 2,048 periods of the fore water return, the counter 77 overflows so as to produce a high level signal at the output of the counter and at the K input terminal of the flip-flop 87. The next negative-going transition of the fore return then switches the flip-flop 87 so as to provide a low output voltage (logic ZERO) at the terminal Q. This removes the direct enabling voltage from AND gates 89 and 76.

It will be noticed that since the $\overline{Q}$ output terminal of the flip-flop 87 is connected to an input terminal of the AND gate 91 in the aft channel, the flip-flop applies enabling pulses to the gates 89 and 91 alternately as the flip-flop is switched from either state to the other.

From the above explanation it can be seen that a bottom return pulse in the fore channel serves to initiate an enabling pulse which is applied to the AND gate 89 for a period of time equal to the time required for the reception of a specified number (e.g., 2,048) of oscillations of the fore return signal.

The second enabling logic section 75 in the aft return channel operates in a similar fashion so as to apply direct enabling signals to the AND gate 91 for a period of time (epoch) equal to the time required for the reception of 2,048 oscillations in the aft return signal.

The above explanation assumed that the vessel was travelling in shallow water so that a significant bottom return pulse was received in each channel. If the vessel is travelling in deeper water so that a significant bottom return pulse is not received, the enabling logic circuits will then respond to a gating pulse from the PRF oscillator 21 of FIG. 4.

Reception of a gating pulse enables the gate 83 in the fore channel and the corresponding gate in the aft channel of the enabling logic circuits. Since the gating pulse occurs after a transmit pulse, the counter 77 in the fore channel and the corresponding counter in the aft channel will have been reset prior to the reception of the gating pulse. Under these conditions, the inverter 79 will be providing a high level output signal so as to permit passage of the gating pulse through the gate 83 and the OR gate 85 so as to provide a high level signal at the J input terminal of the flip-flop 87. The following negative-going transition of the fore return can then switch the flip-flop 87 so as to produce a high level output signal at the Q output terminal of the flip flop 87 and thereby permit fore return transitions to actuate the counter 77.

Thus it can be seen that whether or not a bottom return signal is received, a direct enabling pulse will be applied to the AND gate 89 for a period of time (epoch) required for the reception of the predetermined number of oscillations of the fore return signal.

Since each of the gates 89 and 91 receive complementary enabling signals from the $\overline{Q}$ output terminal of the flip-flop in the opposite channel, it can be seen that either of the gates 89 and 91 will be opened only when the flip-flop in the corresponding channel is producing a high level output at its Q output terminal and the flip-flop in the opposite channel is producing a high level output signal at its $\overline{Q}$ output terminal. Thus the gates 89 and 91 can pass signals only when the counter in the corresponding channel is counting and when the counter in the opposite channel is in its reset condition. In brief, the gates 89 and 91 are opened only during time intervals equal to the difference in times required for the reception of 2,048 fore and aft signals. This period difference measurement is, however, equivalent to the measurement of difference in frequency of the acoustic signals received by the fore and aft channels.

The AND gates 89 and 91 also receive oscillatory signals from clock source 101. In a typical circuit, the clock source produces oscillations at a nominal frequency of 6 MHz. In order to compensate for temperature-caused variations in the velocity of sound in water, the clock frequency may be adjusted for temperature. Such adjustment can be conveniently performed by sensing the water temperature with a temperature sensor 103 and actuating a varactor 105 through a suitable drive circuit 107.

The output signals from the clock source 101 pass through the gates 89 and 91 during the time that these gates are enabled. The resultant signals from the gates 89 and 91 represent time difference signals which may be applied through a suitable dividing circuit such as the circuit 109 to actuate an up-down counter 111.

The use of a high clock frequency such as the 6 MHz frequency suggested earlier is not mandatory. However, it has been found that the use of a high frequency and the subsequent division in the divider 109 minimizes quantization error associated with the gating process.

The counter 111 will accumulate pulses in the "up" sense so as to indicate forward motion of the vessel in response to time difference signals from the gate 91 in the aft channel, and pulses in the "down" sense in response to time difference signals from the gate 89. When the vessel is proceeding in the forward direction, the frequency of the doppler shifted signals at the fore channel will be higher than the corresponding signals at the aft channel so that the duration of the direct enabling pulse in the fore channel will be shorter than the duration of the corresponding direct enabling pulse in the aft channel. Since the gates 89 and 91 are open only during the difference in times of occurrence of the two direct enabling pulses, the gate 91 will pass clock signals during the time that the J-K flip-flop in the aft channel provides a direct enabling signal and the J-K flip-flop 87 in the fore channel has reverted to the state in which it is producing a complementary enabling signal at its $\overline{Q}$ output terminal.

The up-down counter 111 contains a straightforward logic circuit which actuates up or down output terminals in response to up or down time difference signals from the gates 91 or 89 respectively. The counter actuates a suitable readout circuit 112.

Although not strictly part of the invention, a typical readout circuit includes an electronic switch 113 which receives the output signals from the counter 111 through a decimal divider 115 and through a pair of lines 117 shunting the divider.

The electronic switch 113 normally passes signals directly from the counter through the lines 117 to a working register 119. When the count in the register 119 reaches the equivalent of 1 knot, an overflow signal is fed to the electronic switch through a line 120 which actuates the switch 113 so that subsequent signals pass through the decimal divider 15. The same overflow signal shifts the decimal in the working register 119. By this means, speeds below 1 knot may be read with a high resolution whereas speeds of 1 knot or greater are read with a lower resolution.

The output of the counter 111 is also applied to a scale factor divider 121. For the clock frequency and particular dividers heretofore described, it has been found that a factor of 12,800 in divider 121 produces 1 pulse for each 0.1 nautical mile of travel. The output of the divider 121 is applied through a conventional decoder and driver 123 to a display unit 125. The distance display continues to accumulate until reset manually and thus effectively integrates the velocity information.

A reset divider 127 provides an overflow signal after the occurrence of a specified number of transmit pulses. The overflow from the divider 127 transfers the count from the working register 119 to the knots register 129. The knots register thus receives the accumulated count acquired during a large number of measuring epochs. This effectively averages the results of numerous measurements so as to increase accuracy and stability of the speed readout. In the particular embodiment, the divider 127 was chosen to provide a ratio of 384. This provides a measurement of 384 epochs and requires 2.8 seconds for a complete knots measurement.

The count in the knots register is applied to a knots display unit through a conventional decoder-driver 133.

The overflow pulse from the reset divider is also applied to the flip-flop 95. If the count being accumulated was triggered by a bottom return pulse, the bottom indicator lamp 97 is illuminated. The overflow pulse resets the flip-flop and extinguishes the lamp at the termination of the measuring interval.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. A doppler speed log for a marine vessel comprising fore and aft downwardly-looking transducers, means to form periodic transmitting pulses, means for electrically exciting said transducers in response to said transmitting pulses so as to launch bursts of oscillatory sonic energy, said transducers being further constructed and arranged to produce electrical signals in response to reflected portions of said bursts of sonic energy, individual fore and aft channels for processing the respective fore and aft electrical signals, each of said processing channels including means for initiating a time gate, and means for terminating the time gate after the reception of a prescribed large number of oscillatory excursions of the received signal whereby the duration of said time gate is representative of the average period of the received oscillatory energy, said speed log further including means for determining the difference in duration of the respective time gates, and speed indicating means for displaying an indication of speed corresponding to said difference in the durations of said time gates.

2. The speed log of claim 1 wherein the means to initiate the time gate includes means to initiate such time gate at a prescribed time after the termination of a transmitting pulse, said prescribed time being equal to the time required for reflected energy to be returned to the transducer from a specified distance from the hull of the vessel.

3. The speed log of claim 1 further including means for accumulating the results of successive difference determinations, and distance indicating means responsive to said accumulation for displaying the distance travelled by said vessel.

4. The speed log of claim 3 wherein the means for initiating a time gate includes time responsive means for opening the channel to the reception of said electrical signals and means to maintain the channel in an open condition until the termination of a time gate, and wherein the means to determine the difference in duration of the respective time gates includes means in each channel to produce a direct enabling pulse during the time that the channel is in an open condition and means to produce a time difference signal during the occurrence of an enabling pulse in only one of said channels, said indicating means being responsive to said time difference signals.

5. The speed log of claim 4 wherein the means to maintain a channel in the open condition includes a flip-flop connected to produce a direct enabling signal while the channel is open and a complementary enabling signal while the channel is not open, and wherein said means for producing time difference signals includes an AND gate in each channel connected to receive a direct enabling signal from the flip-flop in the corresponding channel and a complementary enabling signal from the flip-flop in the opposite channel, said means for providing readout indications further including a source of clock pulses, each of said AND gates being connected to pass said clock pulses in response to simultaneous direct and complementary enabling pulses from the flip-flops in said corresponding and opposite channels respectively.

6. The speed log of claim 5 wherein the means to provide readout indications further includes an up-down counter connected to count in a first direction in response to time difference signals from one of said AND gates and in the opposite direction in response to time difference signals from the other of said AND gates, said readout indication means including speed indication means to accumulate the change in counter readings resulting from a predetermined number of transmission pulses.

7. The speed log of claim 6 wherein the clock source produces pulses at a repetition rate that is high with respect to the repetition rate of said transmit pulses, said speed log being further characterized in that said counter is coupled to each of said AND gates through an individual pulse rate divider.

8. The speed log of claim 7 wherein the repetition rate of the clock source is responsive to an external voltage, said speed log further including a water temperature sensing element and drive means to provide an external voltage to said clock source.

9. The speed log of claim 4 wherein the time responsive means includes means to produce a gating pulse after the lapse of a specified time interval following the termination of a transmit pulse, and gating means in each channel responsive to said gating pulses for passing electrical signals applied to that channel after the occurrence of a gating pulse, and wherein said means to maintain the channel in an open condition includes overflow counter means responsive to electrical signals passed by said gating means, said counter means being connected to close said gating means after the counter has accepted a predetermined number of cycles of said electrical signal.

10. The speed log of claim 9 wherein each of said fore and aft channels includes a first sub-channel for forming fore and aft return signals respectively and a second sub-channel for forming fore and aft bottom return pulses respectively and wherein said time responsive means further includes a variable gain preamplifier in each channel for coupling electrical signals from a transducer to the corresponding sub-channels, variable threshold comparator means in each of said second sub-channels for forming bottom return pulses whenever a signal coupled from the corresponding preamplifier exceeds the instantaneous threshold established from the comparator, said time responsive means further including means to increase the gain of both preamplifiers linearly during the time interval between the termination of a transmit pulse and the following gating pulse, said time responsive means still further including means to decrease the threshold of said comparator exponentially during the same time interval and means to open said gating means in the corresponding channel in response to a bottom return pulse.

11. The speed log of claim 10 wherein the time responsive means further includes means to set the gain of both preamplifiers at the maximum level throughout a second time interval extending between the occurrence of a gating pulse and the initiation of the next transmit pulse.

12. The speed log of claim 11 wherein the means to form periodic transmitting pulses is a pulse repetition frequency oscillator, said oscillator containing a main capacitor and a constant current source connected thereacross so that said capacitor can be charged linearly with respect to time, a transmit pulse comparator connected to said capacitor and biased to a reference voltage whereby said comparator produces an output voltage whenever the capacitor voltage exceeds said reference voltage, a monostable multivibrator coupled to said comparator so that said multivibrator is triggered into its quasi-stable state in response to an output voltage from said comparator, said multivibrator being adjusted to have a quasi-stable state duration equal to the desired duration of a transmit pulse and being constructed to provide a transmit pulse during the time that the multivibrator is in said quasi-stable state, and switching means for shorting said capacitor throughout the occurrence of a transmit pulse.

13. The speed log of claim 12 wherein said means to produce gating pulses includes a gating pulse comparator in said oscillator, said gating pulse comparator being biased to a reference voltage of lower magnitude than said transmit pulse comparator, said gating pulse comparator being responsive to the voltage across said capacitor, whereby said gating pulse comparator produces an output signal at a predetermined time intermediate two successive transmit pulses, said means to produce a gating pulse further including a differentiating circuit to convert the output voltage of said gating pulse comparator into short duration pulses.

14. The speed log of claim 13 wherein the means for exponentially decreasing the threshold of the threshold comparator includes a parallel R-C network in said oscillator and switching means for connecting said R-C network across a source of voltage during the occurrence of a transmit pulse.

15. The speed log of claim 14 wherein the gain of said variable gain preamplifiers is responsive to a gain control voltage applied thereto, said oscillator including means to couple a voltage from said main capacitor to said preamplifiers until the occurrence of a gating pulse, said oscillator further including means to couple a voltage indicative of the output of said gating pulse comparator to said preamplifiers after the occurrence of a gating pulse.

16. A doppler speed log for a marine vessel comprising fore and aft downwardly-looking transducers, means to form periodic transmitting pulses, means for electrically exciting said transducers in response to said transmitting pulses so as to launch bursts of oscillatory sonic energy, said transducers being further constructed and arranged to produce electrical signals in response to reflected portions of said bursts of sonic energy, individual fore and aft channels for processing the respective fore and aft electrical signals, each of said processing channels including time responsive means for opening the channel to the reception of said electrical signals, means to maintain said channel in an open condition for the reception of a specified number of oscillations of the electrical signal in that channel and means to produce an enabling pulse during the time that the channel is in the open condition, said speed log further including means for producing time difference signals during the occurrence of an enabling pulse in only one of said channels, and means to provide readout indications of the duration of said time difference signals.

\* \* \* \* \*